United States Patent
Kim et al.

(10) Patent No.: US 10,386,651 B2
(45) Date of Patent: Aug. 20, 2019

(54) CAMERA LENS MODULE HAVING POSITION SENSORS BETWEEN COILS AND YOKE PORTIONS GENERATING ATTRACTIVE FORCE

(71) Applicant: JAHWA electronics Co., Ltd., Chungcheongbuk-do (KR)

(72) Inventors: Hee-Seoung Kim, Seoul (KR); In-Soo Kim, Seoul (KR); Yo-Han Noh, Daegu (KR)

(73) Assignee: JAHWA ELECTRONICS CO., LTD., Chungcheongbuk-Do (KR)

( * ) Notice: Subject to any disclaimer, the term of this patent is extended or adjusted under 35 U.S.C. 154(b) by 276 days.

(21) Appl. No.: 15/310,285

(22) PCT Filed: Jan. 5, 2015

(86) PCT No.: PCT/KR2015/000045
§ 371 (c)(1),
(2) Date: Nov. 10, 2016

(87) PCT Pub. No.: WO2016/006780
PCT Pub. Date: Jan. 14, 2016

(65) Prior Publication Data
US 2017/0160558 A1 Jun. 8, 2017

(30) Foreign Application Priority Data

Jul. 8, 2014 (KR) .................. 10-2014-0085131

(51) Int. Cl.
*G02B 27/64* (2006.01)
*H02K 1/34* (2006.01)
(Continued)

(52) U.S. Cl.
CPC ............ *G02B 27/646* (2013.01); *G02B 7/02* (2013.01); *G03B 5/00* (2013.01); *H02K 1/34* (2013.01);
(Continued)

(58) Field of Classification Search
CPC . G02B 7/023; G02B 7/09; G02B 7/10; G02B 7/102; G02B 23/16; G02B 27/64;
(Continued)

(56) References Cited

U.S. PATENT DOCUMENTS

2012/0154614 A1* 6/2012 Moriya .................. G03B 3/10
348/208.5
2013/0016427 A1 1/2013 Sugawara
(Continued)

FOREIGN PATENT DOCUMENTS

CN 103176331 A 6/2013
JP 2006-227062 A 8/2006
(Continued)

OTHER PUBLICATIONS

Patent Search Report dated Dec. 28, 2016 from TW Patent Office in a counterpart Taiwan patent application No. 104110729 (All the cited references are listed herein.).
(Continued)

*Primary Examiner* — Jennifer D. Carruth
*Assistant Examiner* — Ryan S Dunning
(74) *Attorney, Agent, or Firm* — The PL Law Group, PLLC (57) ABSTRACT

A camera lens module includes a base portion to which an image stabilization carrier is mounted; two or more magnets provided in the image stabilization carrier; a coil portion including a plurality of coils and corresponding to each of
(Continued)

the magnets; and a position sensor located between the coils. In addition to the above embodiment, various other embodiments can be implemented.

6 Claims, 5 Drawing Sheets

(51) Int. Cl.

| | | |
|---|---|---|
| H02K 7/08 | (2006.01) | |
| H02K 11/00 | (2016.01) | |
| H02K 11/21 | (2016.01) | |
| H02K 33/00 | (2006.01) | |
| G02B 7/02 | (2006.01) | |
| G03B 5/00 | (2006.01) | |
| H02K 41/035 | (2006.01) | |
| H04N 5/232 | (2006.01) | |
| H02K 11/215 | (2016.01) | |

(52) U.S. Cl.
CPC .............. *H02K 7/08* (2013.01); *H02K 11/21* (2016.01); *H02K 33/00* (2013.01); *H02K 41/0356* (2013.01); *G03B 2205/0007* (2013.01); *G03B 2205/0069* (2013.01); *H02K 11/215* (2016.01); *H04N 5/23264* (2013.01); *H04N 5/23287* (2013.01)

(58) Field of Classification Search
CPC .......... G02B 27/646; G03B 3/10; G03B 5/00; G03B 7/02; G03B 2205/0007; G03B 2205/0015; G03B 2205/0023; G03B 2205/0038; G03B 2205/0069; G03B 2205/0084; G03B 2205/0092; H02K 1/34; H02K 7/08; H02K 11/21; H02K 11/215; H02K 33/00; H02K 41/0356; H04N 5/2253; H04N 5/23264; H04N 5/2328; H04N 5/23287
USPC ................ 348/208.99, 208.4, 208.7, 208.11; 359/554, 557, 819, 822, 823, 824; 396/52, 55
See application file for complete search history.

(56) References Cited

U.S. PATENT DOCUMENTS

| | | |
|---|---|---|
| 2013/0163085 A1 | 6/2013 | Lim et al. |
| 2014/0160311 A1 | 6/2014 | Hwang et al. |
| 2016/0241787 A1* | 8/2016 | Sekimoto ............. H04N 5/2257 |

FOREIGN PATENT DOCUMENTS

| | | |
|---|---|---|
| JP | 2013-24938 A | 2/2013 |
| KR | 10-0849580 B1 | 7/2008 |
| KR | 10-2012-0045333 A | 5/2012 |
| KR | 10-2013-0072721 A | 7/2013 |
| KR | 10-2014-0076213 A | 6/2014 |
| KR | 10-1409324 B1 | 6/2014 |
| TW | M443190 U | 12/2012 |
| TW | 201443540 A | 11/2014 |

OTHER PUBLICATIONS

International Search Report for PCT/KR2015/000045.

* cited by examiner

CAMERA LENS MODULE HAVING POSITION SENSORS BETWEEN COILS AND YOKE PORTIONS GENERATING ATTRACTIVE FORCE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/000045, filed Jan. 5, 2015, which claims priority to the benefit of Korean Patent Application No. 10-2014-0085131 filed in the Korean Intellectual Property Office on Jul. 8, 2014, the entire contents of which are incorporated herein by reference.

TECHNICAL FIELD

Various embodiments of the present disclosure relate to a camera lens module which is mounted to a portable electronic device.

BACKGROUND ART

Recently, with the development of mobile communication technologies, a popularized portable terminal such as a smartphone has appeared and has employed at least one camera lens module which is miniaturized and is light-weighted.

In particular, recent portable terminals require a camera lens module having high capacity and high performance, therefore a camera lens module, having various functions corresponding to those of a digital camera (e.g., a Digital Single Lens Reflex (DSLR)), has been developed actively. Examples of various functions mounted to the camera lens module mounted to a portable terminal are an auto-focus function, a zoom function and an image stabilization function.

Examples of the camera lens modules having an image stabilization function according to the related art corresponds to Korean Patent Application No. 2010-106811, Korean Patent Application No. 2011-0140262, and the like. However, portable terminals are required to be high-functioning as well as miniaturized, so additional configurations for providing high-functionality should be further miniaturized.

In particular, the camera lens module having an image stabilization function should perform precise image stabilizing, using a resultant force obtained by adding two or more forces which are perpendicular to each other. However, there is a problem in that it is difficult to perform precise and rapid image stabilizing in a state in which the size or the number of driving portions should be minimized. That is, driving of the image stabilizing, controlled by a resultant force obtained by adding two or more forces, has a problem in that, while the resultant force is applied, the image stabilizing is driven more largely than a control range, or unnecessary rotation is excessively generated. This is a factor that reduces accuracy and a speed of the driving of the image stabilizing, and should be improved to perform precise and rapid driving of the image stabilizing.

That is, the camera lens module according to the related art has a problem in that, when a current is applied to a coil in order to drive the aforementioned various functions and to perform the image stabilizing, a position sensor located at the central side of the interior of the coil cannot detect the accuracy and the speed of the driving due to a magnetic field induced by the coil so that the camera lens module cannot be driven precisely and promptly.

As a result, an apparatus is required which configured such that the position sensor deviates from an influence of the magnetic field generated by the coil, to minimize the influence of the magnetic field of the coil, so as to improve a function of the position sensor as well as a driving force of the camera lens module.

SUMMARY

Thus, an aspect of the present invention is to provide a camera lens module configured such that a position sensor is located between coils provided in a driving portion so that the position sensor derives from an influence of a magnetic field generated by the coils, thereby improving a driving force of the camera lens module.

Further, another aspect of the present invention is to provide a camera lens module configured such that the position sensor deviates from the influence of the magnetic field generated by coils, thereby preventing malfunctions of the position sensor generated by the magnetic field of the coil, and thus, further improving performance of the camera lens module.

In accordance with various embodiment of the present invention, a camera lens module is provided. The camera lens module includes: a base portion in which an image stabilization carrier is mounted; two or more magnets provided in the image stabilization carrier; a coil portion provided with a plurality of coils and corresponding to the magnets, respectively; and a position sensor located between the coils.

According to various embodiments of the present disclosure, since a position sensor is located between coils provided in a driving portion, the position sensor derives from an influence of a magnetic field generated by the coils and thereby a driving force of the camera lens module improves.

In addition, since the position sensor deviates from the influence of the magnetic field by generated by coils, it is possible to prevent malfunctions of the position sensor and to improve performance of the camera lens module.

DETAILED DESCRIPTION

Hereinafter, various embodiments of the present disclosure will be described in detail. Firstly, terms used in the various embodiments of the present disclosure will be briefly described.

With respect to the terms in the various embodiments of the present disclosure, the general terms which are currently and widely used are selected in consideration of functions of structural elements in the various embodiments of the present disclosure. However, meanings of the terms may be changed according to an inventor's intention, a judicial precedent, appearance of a new technology, and the like. In addition, in some cases, there may be terms optionally selected by the applicant. In these cases, their meanings will be described in detail in the corresponding description parts of various embodiments of the present invention. Thus, the terms used in various embodiments of the present invention should be defined based on the meanings of the terms and the overall contents of the embodiments of the present invention instead of simple titles of the terms.

Although the terms including an ordinal number such as first, second, etc. can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element.

Herein, an electronic device including a camera lens module according to various embodiments of the present disclosure will be described. First, examples of an electronic device to which various embodiments of the present disclosure are applied may include not only all types of mobile communication terminals operating based on communication protocols corresponding to various communication systems, but also all types of information and communication devices, multimedia devices, and application devices thereof, such as a video phone, an electronic book (e-book) reader, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic accessory, electronic tattoos, or a smart watch).

According to some embodiments, the electronic device may be a smart home appliance. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to an embodiment, an electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recoder (EDR), a Flight Data Recoder (FDR), a vehicle infotainment device, an electronic equipment for ship (for example a ship navigation device and gyro-compass and the like, avionics, a security device, a head unit for vehicle, an industrial or household robot, ATM (automatic teller machine) in banking facilities or POS (point of sales) in stores.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves).

An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

In addition, the camera lens module applied to the electronic device may be configured by one of a camera lens module having an image stabilization function, a Virtual Channel Memory (VCM) type camera lens module and an encoder type camera lens module. In the present embodiment, the camera lens module will be described by exemplifying the aforementioned camera lens module, but is not limited thereto. That is, the camera lens module may be variously applied as long as the camera lens module drives a lens carrier by its driving portion. In the present embodiment, a description will be given of the camera lens module having an image stabilization function.

Figure 1:
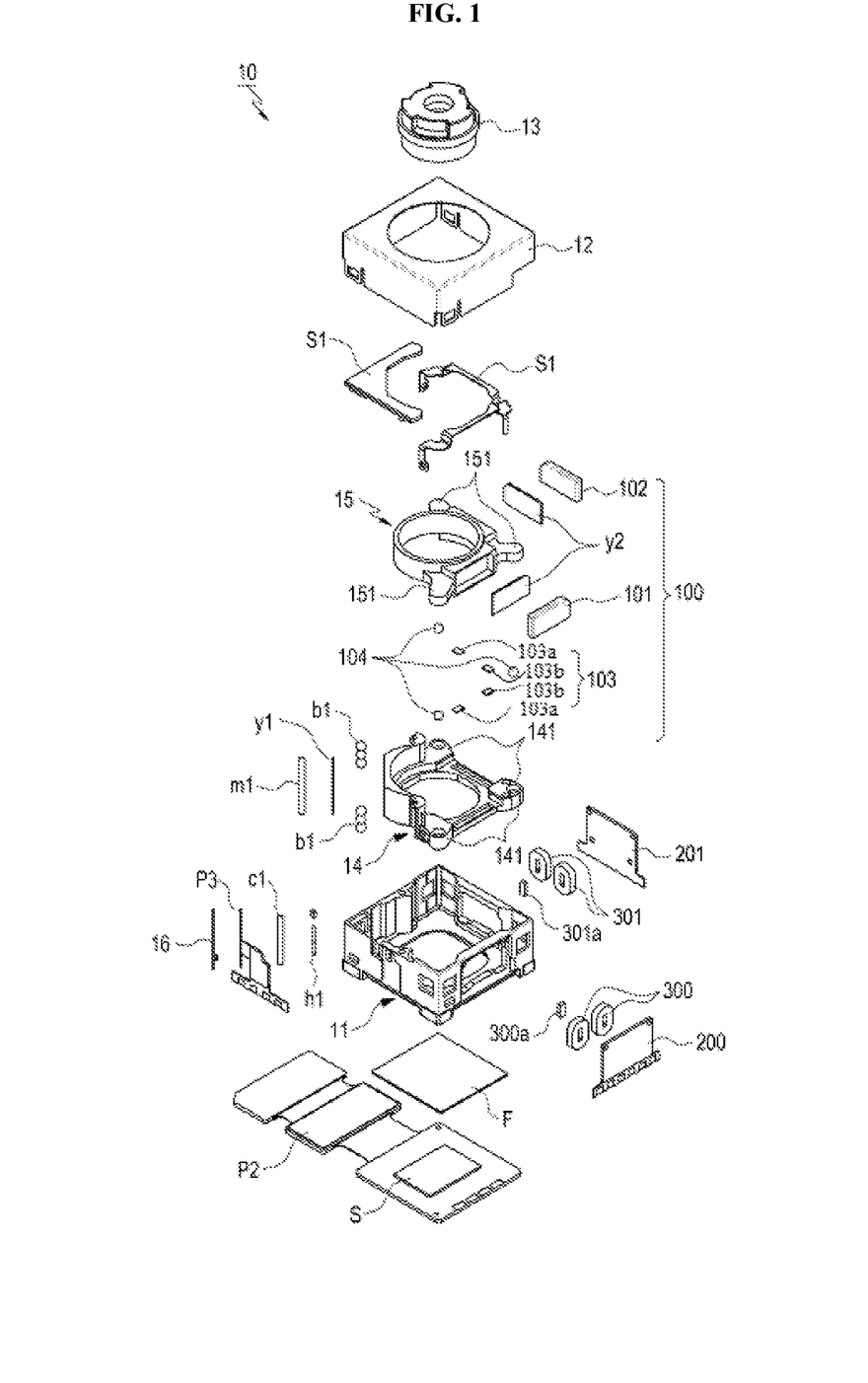
FIG. 1 is an exploded perspective view illustrating a configuration of a camera lens module according to various embodiments of the present invention.
Figure 2:
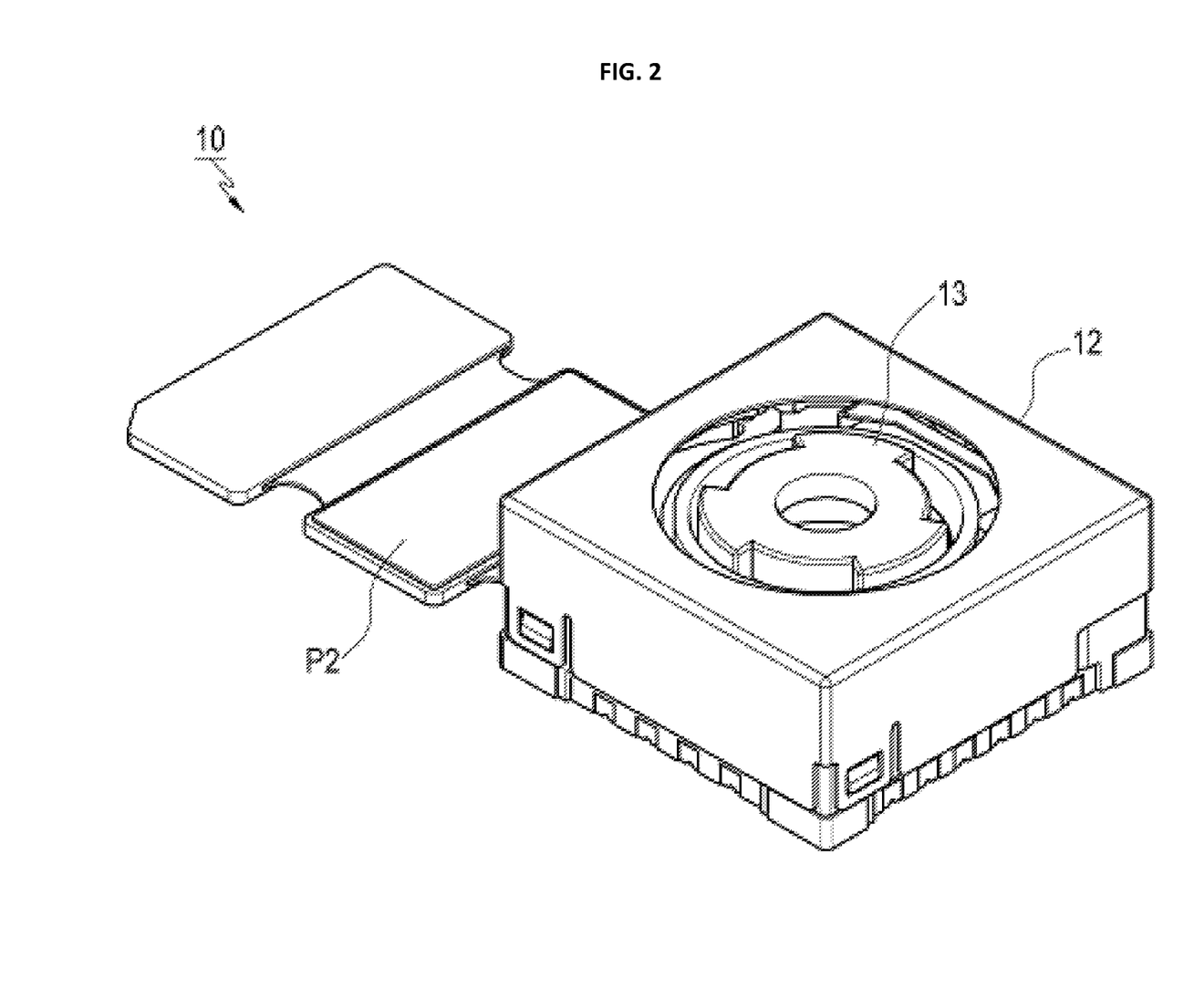
FIG. 2 is a perspective view illustrating a coupling state of the camera lens module according to various embodiments of the present invention.

FIG. 1 is an exploded perspective view illustrating a configuration of a camera lens module according to the present invention, and FIG. 2 is a perspective view illustrating a coupling state of a camera lens module according to various embodiment of the present invention.

Referring to FIGS. 1 and 2, a configuration of the camera lens module 10 will be described. The camera lens module 10 includes a base portion 11, a lens barrel carrier 14, an auto-focus driving portion, an image stabilization carrier 15, an image stabilization driving portion, and a rolling portion 100.

The base portion 11 may include the lens barrel carrier 14, the Auto-Focus (AF) driving portion, the image stabilization carrier 15, and the image stabilization driving portion, and the rolling portion 100.

The lens barrel carrier 14 drivably supports the image stabilization carrier 15 which will be described, and is mounted in the base portion 11.

The AF driving portion is disposed between the base portion 11 and the lens barrel carrier 14 to be able to move the lens barrel carrier 14 along an optical axis.

The image stabilization carrier 15 is seated on the lens barrel carrier 14 such that a lens barrel 13 is provided.

The image stabilization driving portion is provided between the base portion 11 and the image stabilization carrier 15 to correct a balance condition of the lens barrel carrier 14.

The rolling portion 100 is disposed between the lens barrel carrier 14 and the image stabilization carrier 15 in parallel in a direction perpendicular to the optical axis such that the image stabilization carrier 15 can drive image stabilizing on the lens barrel carrier 14 by a rolling operation.

The image stabilization driving portion includes first and second image stabilization magnets 101 and 102, first and second image stabilization coils 300 and 301, yoke portions 103 respectively corresponding to the image stabilization magnets 101 and 102.

Figure 3:
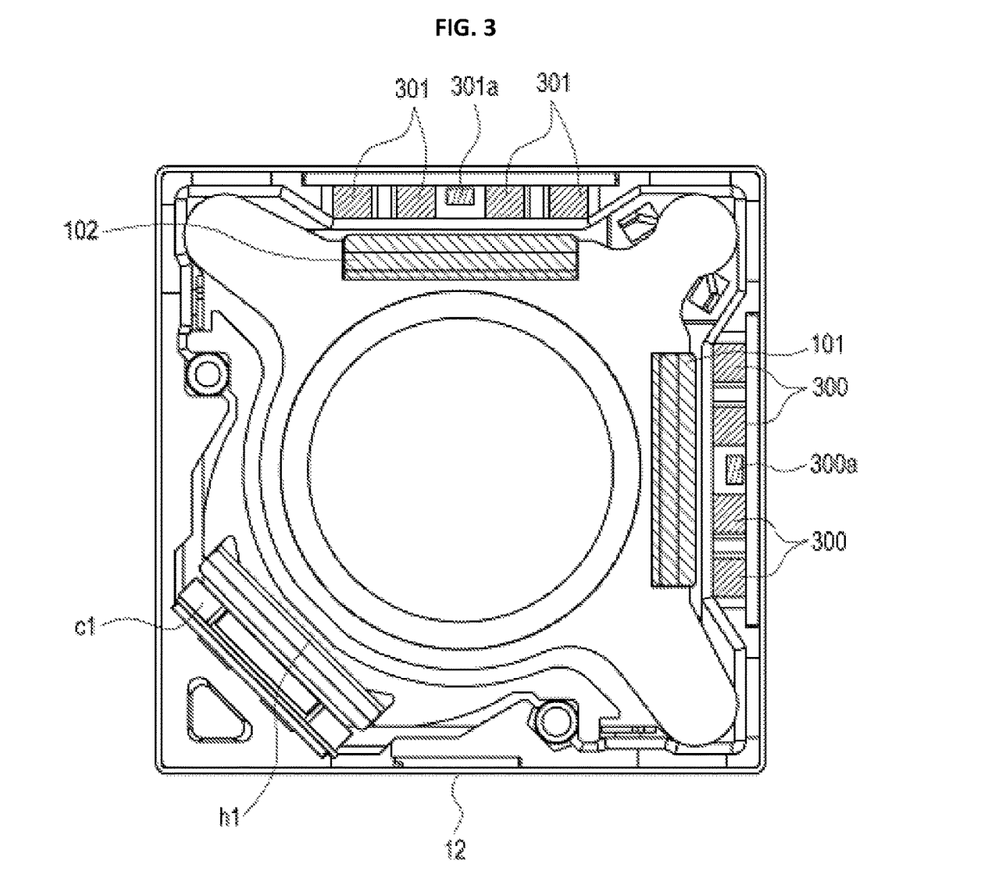
FIG. 3 is a plan view illustrating a configuration of a camera lens module according to various embodiments of the present invention.
Figure 4:
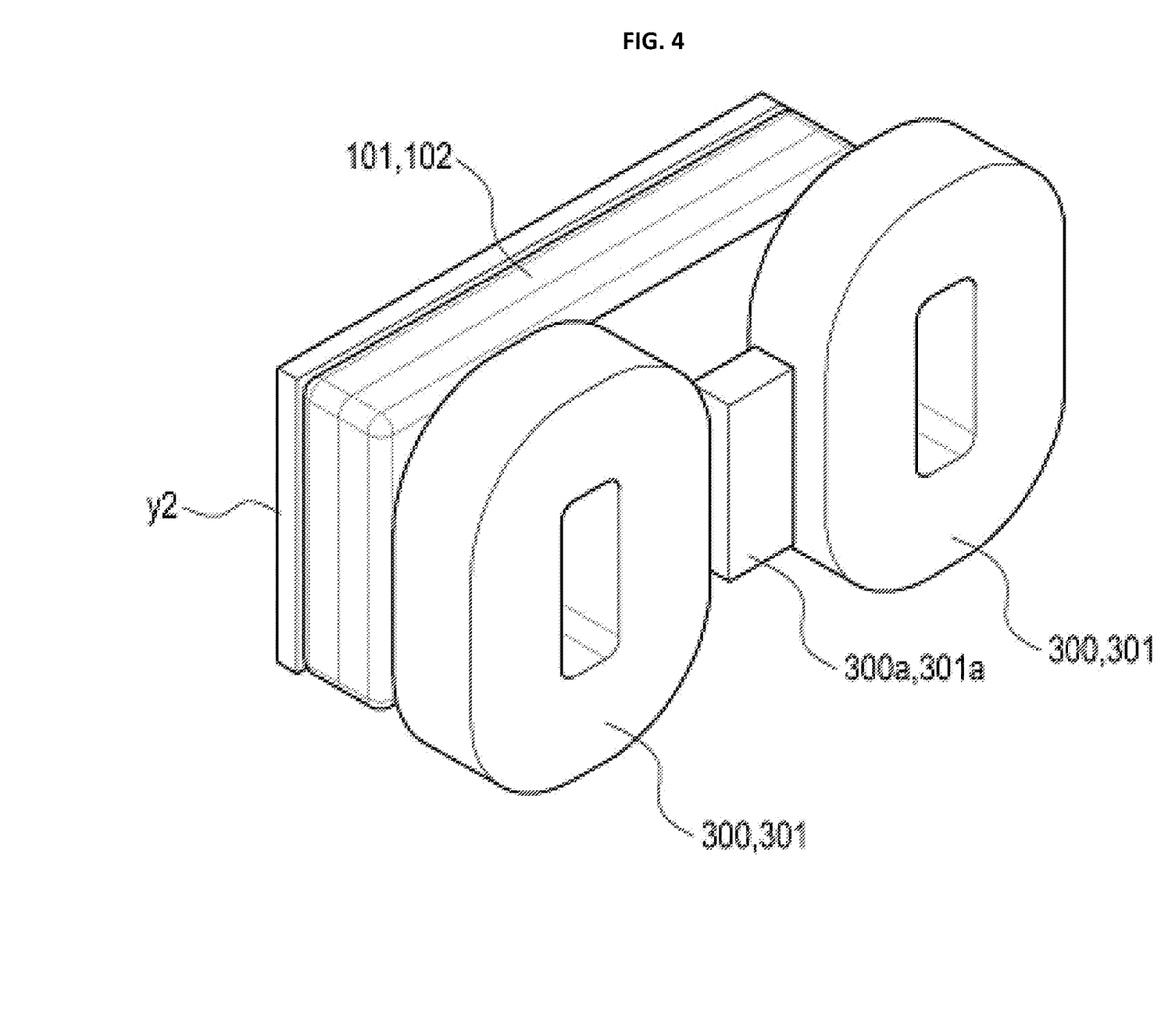
FIG. 4 is a perspective view illustrating a coil and a position sensor in the configuration of the camera lens module according to various embodiments of the present invention.

As illustrated in FIGS. 3 and 4, first and second position sensors 300a and 301a may be disposed between the first and second image stabilization coils 300 and 301 not to be affected by a magnetic field of the coils.

That is, the first and second position sensors 300a and 301a are disposed between the first and second image stabilization coils 300 and 301 to derive from the influence of the magnetic field generated by the first and second image stabilization coils 300 and 301. Thus, it is possible to prevent malfunctions of the first and second position sensors 300a and 301a, which is caused by the magnetic field generated by the first and second image stabilization coils 300 and 301, and to prevent performance deterioration of the camera lens module.

Figure 5:
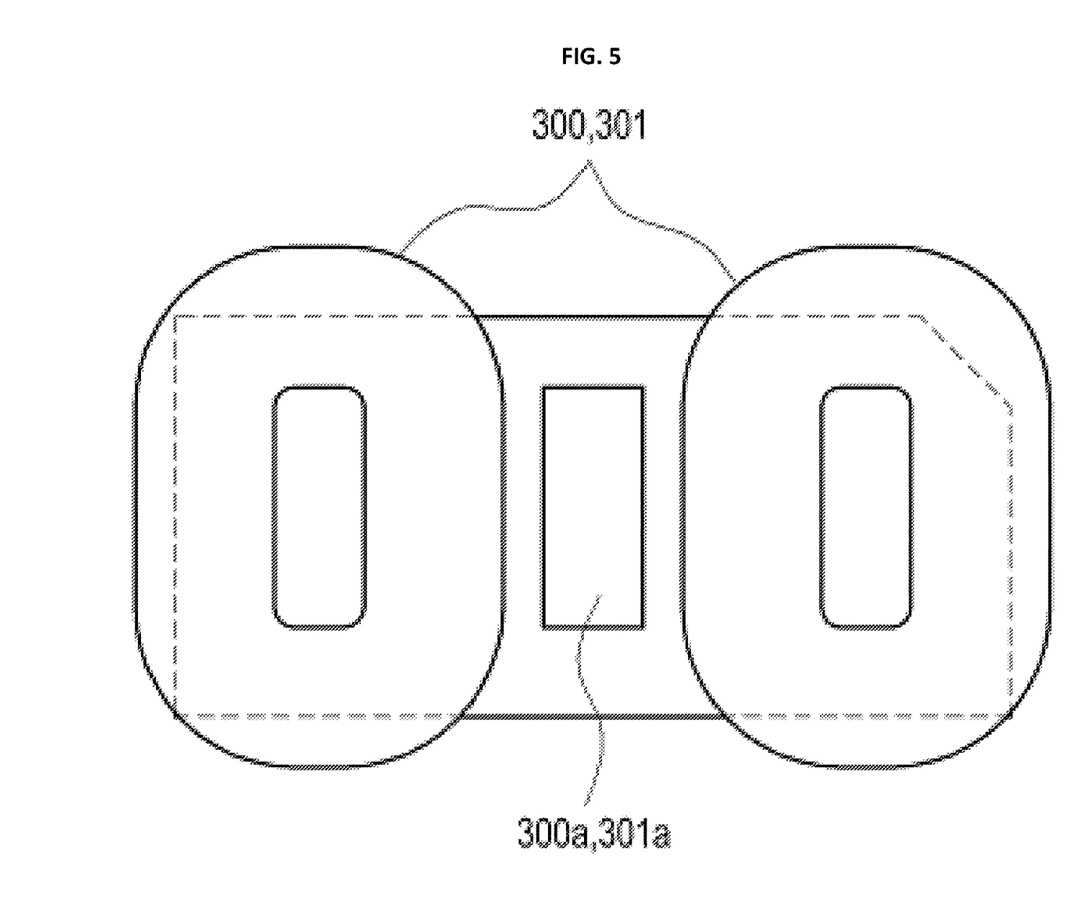
FIG. 5 is a front view illustrating the coil and the position sensor in the configuration of the camera lens module according to various embodiments of the present invention.

In other words, as illustrated in FIGS. 3 and 5, the first position sensor 300a is disposed between the first image stabilization coils 300 or in a space formed between the first image stabilization coils 300. In this state, the first position sensor 300a and the first image stabilization coils 300 are disposed to directly face the first image stabilization magnet 101.

Further, the second position sensor 301a is disposed between the second image stabilization coils 301 and is disposed in a space formed between the second image stabilization coils 301. In this state, the second position sensor 301a and the second image stabilization coils 301 are disposed to directly face the second image stabilization magnet 102. In detail, the respective first and second position sensors 300a and 301a are mounted and received in the spaces between the respective image stabilization coils 300 and 301 to face the first and second image stabilization magnets 101 and 102.

In addition, the first and second position sensors 300a and 301a may be disposed between the first and second image stabilization coils 300 and 301, or at outer peripheries of the first and second image stabilization coils 300 and 301.

Further, as illustrated in FIG. 1, the camera lens module may include one or more auxiliary base portions, the auxiliary base portion may include first, second and third auxiliary base portions 200, 201 and 16 and the first and second auxiliary base portions 200 and 201 may be disposed on respective side surfaces of the base portion to support the first and second image stabilization coils 300 and 301.

That is, the first and second image stabilization coils 300 and 301 are provided on the side surfaces of the first and second auxiliary base portions 200 and 201, are mounted to both side surfaces of the base portions 11, and are disposed to face the first and second image stabilization magnets 101 and 102 at the same time.

The auxiliary base portion may correspond to an electric substrate such as a Printed Circuit Board (PCB) and a Flexible Printed Circuit Board (FPCB), and may be electrically connected to an external power source.

A ball bearing 104 is located between the lens barrel carrier 14 and the image stabilization carrier 15 such that the image stabilization carrier 15 can roll on the lens barrel carrier 14.

The yoke portions 103 are located on the lens barrel carrier 14 to correspond to a lower portion of each of the image stabilization magnets 101 and 102. The yoke portion 103 may comprises a plurality of yokes which are spaced apart from each other.

The first and second image stabilization coils 300 and 301 are connected to each other in series, the first image stabilization coil 300 is disposed in the one first image stabilization magnet 101 while being divided into two parts, and likewise, the second image stabilization coil 301 is disposed in the second image stabilization magnet 102 while being divided into two parts. That is, the first and second image stabilization coils 300 and 301 are disposed in pairs.

Referring to FIGS. 1 and 2, a configuration of the camera lens module will be described in detail.

Since an outer appearance of the camera lens module 10 is illustrated in FIGS. 1 and 2, only upper ends of the base portion 11, the third auxiliary base portion 16, an outer case 12, a circuit substrate P2, and a lens barrel 13 of the camera lens module 10 are illustrated. A three dimensional X/Y/Z coordinate system is illustrated in the above drawings. The "Z-axis" implies an optical axis along which the lens barrel 13 moves in a direction perpendicular to the camera lens module 10, the "X-axis" implies a horizontal direction of the camera lens module 10 (direction perpendicular to the optical axis), and the "Y-axis" implies a vertical direction of the camera lens module 10 (direction perpendicular to the optical axis and the X-axis). The AF driving portion, which will be described below, provides a driving force for adjusting a focus by moving the lens barrel 13 along the optical axis, and an Optical Image Stabilization (OIS) driving portion provides a driving force applied in a direction perpendicular to the optical axis of the image stabilization carrier (illustrated in FIG. 3) in an X-Y direction to correct the horizontal balance state.

A configuration of the camera lens module 10 according to various embodiments of the present invention will be described with reference to the above-mentioned FIG. 1. The module 10, which will be described below, aims to be light-weighted, shortened, and small-sized. An installation space of the driving portions, which occupy a large space in the module 10 (the AF driving portion and the two image stabilization driving portions which will be described below), is optimized, and particularly, the AF driving portion is provided at an edge of the module, one image stabilization driving portion is provided on one side surface among side surfaces of the module, and the other image stabilization driving portion is provided on the other side surface, thereby achieving miniaturization.

In general, the well-known lens barrel 13 has a cylindrical shape, and the outer case 12 has a polyhedral shape, especially, a rectangular shape or a cubic shape. Further, the lens barrel 13 is received in the outer case 12.

In the embodiment of the present invention, the AF driving portion is installed at an edge of the outer case 12 of the module, and the first and second image stabilization driving portion is installed on the side surfaces of the outer case of the module, thereby optimizing the ability of the of components constituting the module to be mountable. In particular, in the embodiment of the present invention, an auto-focusing operation and an image stabilization operation are performed in a state where the image stabilization carrier 15 moves on the lens barrel carrier by rolling friction.

The module 10 has an approximately rectangular outer appearance, and includes the outer case 12, the base portion 11, the third auxiliary base portion 16, the lens barrel 13, at least one image stabilization portion (including the image stabilization carrier 15 and the image stabilization driving portion), an AF adjustment portion (including the lens barrel carrier and the AF driving portion), one or more circuit substrates P2 and P3, and a guide device for guiding one or more lens barrels along the optical axis.

The outer case 12 is coupled to the base portion 11 to perform, while receiving important components, a housing function of protecting the received components. The outer case 12 is formed of a metal material to be in charge of a shielding function. In the outer case 12, the two circuit substrates P2 and P3 are extracted to the outside in order to be electrically connected to a not-illustrated external electric power source.

The lens barrel 13 has a cylindrical shape, and adjusts the focus of a lens by moving along the optical axis by the AF driving portion. The lens barrel carrier 14 is completely received in the base portion 11, and has a flat rectangular magnet mounting groove 140 provided on an outer periphery surface thereof. The lens barrel carrier 14 is guided by means of a pair of guide devices along the optical axis. Each of the guide devices includes a well-known guide portion and a plurality of ball bearings b1. The lens barrel 13 may have a structure which can be separated from and coupled to the lens barrel carrier 14, or may have a structure which is integrated with the lens barrel carrier 14.

A driving device of the camera lens module 10 according to the present invention includes one AF driving portion and two image stabilization driving portion. In the present invention, a configuration in which the AF driving portion includes a singular AF driving portion is described as an example. Further, the two image stabilization driving portions are arranged on one surface opposite to one surface on which the AF driving portion is located, with respect to the optical axis, to be spaced apart from each other. Although a configuration, in which the image stabilization driving portion is configured by the first and second image stabilization driving portions and is mounted on a side surface of a lens barrel case, is described as an example of the present invention, the present invention is not limited to the side surface, and can be changed such that two or more image stabilization driving portions are installed when the image stabilization driving portions can be mounted to an empty edge space in the module.

Hereinafter, a configuration of the image stabilization driving portion will be described. The image stabilization driving portions are respectively disposed on two or more side surfaces in a shaken area, so as to correct a hand shake state of the image stabilization carrier 15.

Hereinafter, the first and second image stabilization driving portions respectively disposed on first and second side surface areas will be described. The "first and second side surface areas" refer to both side surface areas opposite to the AF driving portion, and respectively refer to a space including both side surfaces located in the image stabilization carrier to which first and second image stabilization magnets are mounted, and a space including both side surface areas in the base portion 11 and opposite to the AF driving portion, which will be described below.

The first and second image stabilization driving portions are disposed on the first and second side surface areas opposite the AF driving portion to head toward centers of the first and second side surface areas opposite to one surface on which the AF driving portion is disposed. The first and second image stabilization driving portion corrects a balance state (X-Y axis) of the image stabilization carrier 15 along the optical axis by using a resultant force between forces generated by a magnetic field.

As illustrated in FIGS. 1 and 3, the first image stabilization driving portion includes the first image stabilization magnet 101 mounted to a mounting groove provided on the outer surface of the image stabilization carrier 15 and disposed in the first side surface area of the image stabilization carrier 15 to face towards a center portion. Further, the first image stabilization driving portion includes the first image stabilization coil 300 disposed in the first side surface area of the base portion 11 to head toward the center portion and facing and being spaced apart from the first image stabilization magnet 101. Further, the first image stabilization driving portion includes the first position sensor 300a disposed in the first side surface area of the base portion 11 and disposed between the first image stabilization coils 300.

When a current is applied to the first image stabilization coils 300, a magnetic field is generated by the first image stabilization magnet 101 and the first image stabilization coils 300, and a force obtained by the magnetic field becomes a driving force for correcting XY axes shaking of the lens barrel 13. At this time, the first position sensor 300a is disposed between the first image stabilization coils 300 and is configured by a hall sensor at the same time, so as not to be affected by the magnetic field of the coils 300.

As illustrated in FIGS. 1 and 3, the second image stabilization driving portion includes the second image stabilization magnet 102 mounted to a mounting groove provided on the outer surface of the image stabilization carrier 15 and disposed in the second side surface area of the image stabilization carrier 15 to face towards a center portion. Further, the second image stabilization driving portion includes the second image stabilization coil 301 disposed in the second side surface area of the base portion 11 to face towards the center portion and facing and being spaced apart from the second image stabilization magnet 102. Further, the second image stabilization driving portion includes the second position sensor 301a disposed in the second side surface area of the base portion 11 and disposed between the second image stabilization coils 301.

When a current is applied to the second image stabilization coils 301, a magnetic field is generated by the second image stabilization magnet 102 and the second image stabilization coils 301, and a force obtained by the magnetic field becomes a driving force for correcting XY axes shaking of the lens barrel 13. At this time, the second position sensor 301a is disposed between the second image stabilization coils 301 and is configured by a hall sensor at the same time, so as not to be affected by the magnetic field of the coils. Thus, the image stabilization carrier 15 can correct the shaking state of the lens barrel by a resultant force obtained from forces generated by the first and second image stabilization magnets 101 and 102 and the first and second image stabilization coils 300 and 301, focusing on XY axes.

The first position sensor 300a is disposed between the first image stabilization coils 300 and is disposed on the inner side surface of the first side surface area at the same time, and more particularly, is disposed on the rear surface of the first image stabilization coil 300, and is disposed at an inner side between the first image stabilization coils 300 so as to directly face the first image stabilization magnet 101. Further, the second position sensor 301a is disposed on the inner side surface of the second side surface area, and more particularly, is disposed on the rear surface of the second image stabilization coils 301 and is disposed at an inner side between the second image stabilization coils 301 so as to directly face the second image stabilization magnet 102.

The AF driving portion corresponds to a driving portion disposed between one side of the lens barrel carrier 14 and the third auxiliary base portion 16 coupled to one surface among surfaces of the outer case 12 facing each other, to move the lens barrel 13 along the optical axis. The AF driving portion includes an AF magnet ml mounted on the outer peripheral surface of the lens barrel carrier 14 in parallel to one surface of the outer case 12, an AF coil c1 disposed in the third auxiliary base portion 16 and disposed to face the AF magnet ml, and a driving Integrated Circuit (IC) disposed next to the AF coil c1. When a current is applied to the AF coil c1, the lens barrel 13 moves along the optical axis by a magnetic field generated between the AF coil 13 and the AF magnet ml, thereby automatically adjusting a focal distance between a not-illustrated lens and an image sensor. An AF position sensor hl may be disposed in a receiving space within the AF coil, and may be included in the driving IC. The AF position sensor includes a hole sensor.

The AF driving portion includes the AF circuit substrate disposed on the inner surface of the third auxiliary base 16, and includes the AF circuit substrate disposed on the upper surface of the base portion 11. In FIG. 1, reference numeral "F" refers to an "IR filter", and reference numeral "s" refers to an "image sensor". Further, reference numeral "S1" refers to a stopper.

Meanwhile, the image stabilization carrier 15 includes a hollow body 150 having an interior space for receiving the lens barrel 13 in the optical axis, and one or more first support bodies 151 protruding from the bottom of the hollow body 150 in an outer peripheral direction, and disposed to be spaced apart from each other. Further, the image stabilization carrier 15 is mounted to an opened portion of the lens barrel carrier 14 to face the base portion 11. In the image stabilization carrier 15, the lens barrel 13 is received within the hollow body 150 so that the inner surface of the hollow body 150 encloses the outer peripheral surface of the lens barrel 13 while having an interval. Each of portions between the first support bodies 151 are opened, and this structure allows the one or more yoke portions 103 to directly face the first and second image stabilization magnets 101 and 102, so that the image stabilization carrier 15 is centered on the AF carrier 14 by an attractive force between the yoke portions 103 and the first and second image stabilization magnets 101 and 102.

Meanwhile, a rolling portion 100 for centering the image stabilization carrier 15 is provided between the upper surface of the lens barrel carrier 14 and the bottom surface of the image stabilization carrier 15. The rolling portion 100 includes first image stabilization magnets 101 and 102, one or more yoke portions 103, and a plurality of ball bearings 104. The ball bearing b2 is disposed between the lens barrel carrier 14 and the image stabilization carrier 15 to be in contact with each other while having an interval, so as to support the image stabilization carrier 15. The yoke portions 103 are disposed to be symmetric to the lens barrel carrier 14, and are disposed to face each of the first and second image stabilization magnets 101 and 102 constituting the first and second image stabilization driving portion. The yoke portions 103 are formed of a magnetic material, for example, a metal material. The image stabilization carrier 15 can be stably centered on the ball bearing 104 by the attractive force between the yoke portions and the first and second image stabilization magnets 101 and 102, and can adjust a central position using a minute rolling operation. Each of the ball bearings 104 operates while being disposed between the bottom surface of the first support body 151 and the upper surface of the second support body 141.

When a current is applied to the AF coil of the AF driving portion, the lens barrel 13 rectilinearly moves along the optical axis. At this time, a focal distance between the lens (not illustrated) and the image sensor is automatically adjusted.

In other words, when the lens barrel 13 moves rectilinearly to generate a driving force, the image stabilization carrier 15 coupled to the lens barrel 13 moves rectilinearly, and the image stabilization carrier 15 generates a rotational force in one direction. Here, when the image stabilization is driven by a resultant force of the X and Y axes, an unnecessary excessive rotational force may be generated in addition to a stabilization driving force. As a means for resolving this problem, first and second divided yoke portions, etc. may be applied. That is, the rotational force corresponds to a problem which may be incidentally generated, but may be considered as a phenomenon which is necessarily generated.

At this time, as a current is applied to the first image stabilization coil 300 of the first image stabilization driving portion in order to perform image stabilization of the image stabilization carrier 15, a magnetic force is generated from the first image stabilization magnet 101 and the first image stabilization coil 300, and the magnetic force becomes a driving force for performing X-axis image stabilization of the lens barrel 13.

In other words, when the image stabilization carrier 15 is driven, both the lens barrel 13 and the image stabilization carrier 15 generate a rotational force. At this time, the first yoke 103*a* faces one side area 101*a* of the first image stabilization magnet 101, so as to rotate the image stabilization carrier 15 in the one direction by the first yoke portion 103*a* and a magnetic force of the first image stabilization magnet 101. The second yoke 103*b* faces the other side area of the first image stabilization magnet 101, so as to reversely rotate the image stabilization carrier 15 in the other direction by the second yoke portion 103*b* and a magnetic force of the first image stabilization magnet 101.

Accordingly, the first and second yoke portions 103*a* and 103*b* center the image stabilization carrier 15 by a magnetic field by reacting with the first image stabilization magnet 101 (providing centering).

At this time, the first position sensor 300*a* is disposed between the first image stabilization coils 300, thereby minimizing an influence of a magnetic field of the first image stabilization coils 300. Accordingly, the first position sensor 300*a* can improve driving sensing of the image stabilization carrier 15.

Further, when a current is applied to the AF coil of the AF driving portion, the lens barrel 13 rectilinearly moves along the optical axis. At this time, a focal distance between the lens (not illustrated) and the image sensor is automatically adjusted.

In other words, when the lens barrel 13 moves rectilinearly to generate a driving force, the image stabilization carrier 15 coupled to the lens barrel 13 moves rectilinearly, and the image stabilization carrier 15 generates a rotational force in one direction.

At this time, as a current is applied to the second image stabilization coil 301 of the second image stabilization driving portion in order to perform image stabilization of the image stabilization carrier 15, a magnetic force is generated from the second image stabilization magnet 102 and the second image stabilization coil 301, and the magnetic force becomes a driving force for performing Y-axis image stabilization of the lens barrel 13.

In other words, when the image stabilization carrier is driven, both the lens barrel 13 and the image stabilization carrier 15 generate a rotational force.

At this time, the first yoke 103*a* faces one side area 102*a* of the second image stabilization magnet 102, so as to rotate the image stabilization carrier 15 in the one direction by the first yoke portion 103*a* and a magnetic force of the first image stabilization magnet 102.

At this time, the second yoke 103*b* faces the other side area of the second image stabilization magnet 102, so as to reversely rotate the image stabilization carrier 15 in the other direction by the second yoke portion 103*b* and a magnetic force of the second image stabilization magnet 102.

In this way, the first and second yoke portions 103*a* and 103*b* centers the image stabilization carrier 15 by a magnetic field by reacting with the second image stabilization magnet 102 (providing centering).

Likewise, the second position sensor 301*a* is disposed between the second image stabilization coils 301, thereby minimizing an influence of a magnetic field of the second image stabilization coils 301. Accordingly, the second position sensor 301a can improve driving sensing of the image stabilization carrier 15.

In this way, in the existing camera lens module, when a current is applied to the driving portion and the coils in order to correct hand shaking, it is difficult for the position sensor located at an inner central side of the coils, to detect an accuracy and a speed of driving, due to an influence of a magnetic field induced by the coils, so that the camera lens module cannot perform minute and rapid driving.

Thus, in the present embodiment, the first and second position sensors are disposed between the first and second image stabilization coils, so that, when a current is applied, the camera lens module according to the present invention deviates from the influence of the magnetic field of the first and second image stabilization coils, has a more improved function of the position sensors at the same time, and prevents malfunction of the position sensors, thereby improving a driving performance of the camera lens module.

While the present invention has been shown and described with reference to certain embodiments thereof, it will be apparent to those skilled in the art that the camera lens module according to the present disclosure is not limited to these embodiments, and various changes in form and details may be made therein without departing from the spirit and scope of the present invention as defined by the appended claims.

The invention claimed is:

1. A camera lens module comprising:
an image stabilization carrier;
a base portion to which the image stabilization carrier is mounted;
magnets provided in the image stabilization carrier;
coil portions each including a plurality of coils and corresponding to the magnets, respectively, the coil portions facing the magnets, respectively;
position sensors each located within a space made between two coils of the plurality of coils of each of the coil portions, respectively;
auxiliary base portions disposed respectively at each lateral side of the base portion to support each of the coil portions;
a lens barrel carrier having an opening in which the image stabilization carrier is positioned for drivably supporting the image stabilization carrier and mounted in the base portion;
a ball bearing located between an inner sidewall of the lens barrel carrier and an outer sidewall of the image stabilization carrier to allow the image stabilization carrier to roll on the lens barrel carrier; and
yoke portions located on the lens barrel carrier and separated from the magnets, the yoke portions facing upwards to face bottoms of the magnets, respectively, wherein each of the yoke portions comprises a plurality of yokes spaced apart from each other, the each of the yoke portions generates attractive force to corresponding each of the magnets, and the plurality of yokes of the yoke portions face different area of the same side of corresponding each of the magnets.

2. The camera lens module as claimed in claim 1, wherein each of the position sensors is disposed at a peripheral portion of the coils and is disposed at a location where a magnetic field of the coils is not substantially affected by the position sensors.

3. The camera lens module as claimed in claim 1, wherein the coils are connected to each other in series.

4. The camera lens module as claimed in claim 1, wherein the plurality of coils are coils each of which an axis is parallel to a bottom of the base portion.

5. A camera lens module comprising:
an image stabilization carrier;
a base portion having an upper opening through which the image stabilization carrier is inserted;
a first image stabilization magnet positioned on a first side of the image stabilization carrier;
a second image stabilization magnet positioned on a second side of the image stabilization carrier;
first image stabilization coils facing the first image stabilization magnet;
second image stabilization coils facing the second image stabilization magnet, the second image stabilization coils and the first image stabilization coils facing different directions;
a first position sensor interposed in a space made between the first image stabilization coils;
a second position sensor interposed in a space made between the second image stabilization coils;
a first auxiliary base portion and a second auxiliary base portion disposed respectively at each lateral side of the base portion to support the first image stabilization coils and the second image stabilization coils;
a lens barrel carrier mounted in the base portion, the lens barrel carrier on which the image stabilization carrier is seated for drivably supporting the image stabilization carrier;
a ball bearing located between an inner sidewall of the lens barrel carrier and an outer sidewall of the image stabilization carrier to allow the image stabilization carrier to roll on the lens barrel carrier;
a first yoke portion and a second yoke portion located on the lens barrel carrier, the first yoke portion having yokes spaced apart and facing upwards to face a bottom of the first image stabilization magnet, the second yoke portion having yokes spaced apart and facing upwards to face a bottom of the second image stabilization magnet, each of the first and second yoke portions generates an attractive force to corresponding each of the first and second image stabilization magnets, wherein the bottoms of the first and second image stabilization magnets face a direction of a bottom of the base portion.

6. The camera lens module as claimed in claim 5, wherein axes of the first image stabilization coils and the second image stabilization coils are parallel to a bottom of the base portion.

* * * * *